United States Patent [19]

Lösel et al.

[11] 3,907,775

[45] Sept. 23, 1975

[54] 15',16'-LOWER ALKOXYMETHYLIDENE-DIGITOXINS

[75] Inventors: Walter Lösel, Ingelheim am Rhein; Werner Traunecker, Munster-Sarmsheim; Wolfgang Hoefke, Budenheim, all of Germany

[73] Assignee: Boehringer Ingelheim GmbH, Ingelheim am Rhein, Germany

[22] Filed: Oct. 25, 1974

[21] Appl. No.: 517,909

[30] Foreign Application Priority Data

Oct. 29, 1973 Germany............................ 2354119

[52] U.S. Cl............................... 260/210.5; 424/182
[51] Int. Cl.[2]............................................ C07J 53/00
[58] Field of Search.................................. 260/210.5

[56] References Cited

UNITED STATES PATENTS 3,476,742  11/1969  Voigtlander et al............. 260/210.5
3,804,825  4/1974   Lösel et al...................... 260/210.5

Primary Examiner—Johnnie R. Brown
Assistant Examiner—Cary B. Owens
Attorney, Agent, or Firm—Hammond & Littell

[57] ABSTRACT

Compounds of the formula

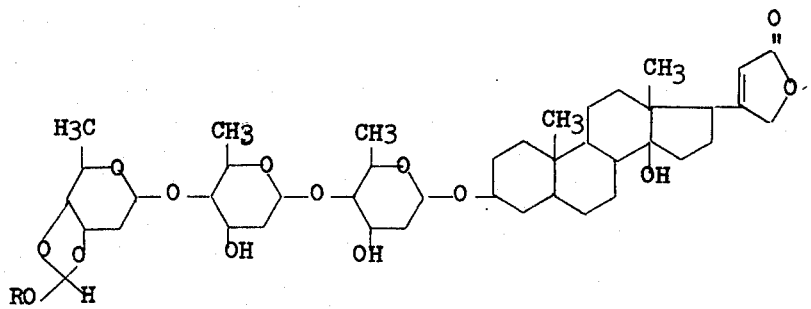

wherein R is n-alkyl of 1 to 4 carbon atoms, which are useful as cardiotonics.

4 Claims, No Drawings

15',16'-LOWER ALKOXYMETHYLIDENE-DIGITOXINS

This invention relates to novel 15',16'-lower alkoxymethylidene-digitoxins and a method of preparing these compounds.

More particularly, the present invention relates to a novel class of digitoxin derivatives represented by the formula

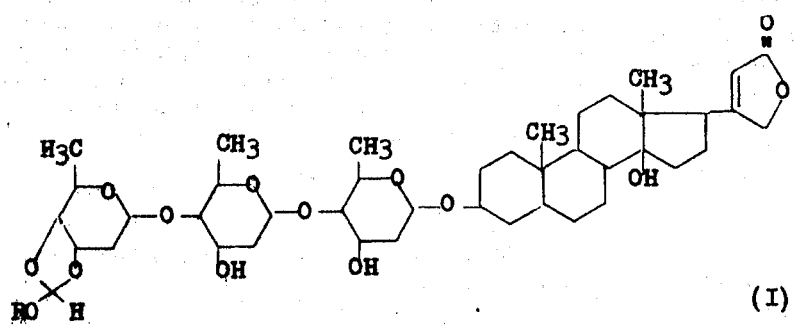

(I)

wherein R is n-alkyl of 1 to 4 carbon atoms.

The compounds embraced by formula I above are prepared by reacting digitoxin with an orthoformate of the formula

(II)

wherein R has the same meanings as in formula I, in the presence of an acid catalyst. The orthoformic acid tri-n-alkyl-ester of the formula II is provided in equimolar amount or in excess thereover, preferably in a ratio of up to 10 mols per mol of glycoside.

The reaction may, if desired, be performed in the presence of a wide variety of inert solvent media, such as chloroform, methylene chloride, tetrahydrofuran, dioxane or mixtures of any two or more of these, preferably mixtures of tetrahydrofuran and dioxane.

To the extent that the stability of the glycoside starting compound permits it, the reaction temperature is not critical; however, a reaction temperature between 0° and 50°C., and particularly room temperature, is preferred.

Suitable catalysts are acid substances in the broadest sense. Particular examples include inorganic and organic acids, such as hydrohalic acids, sulfuric acid, perchloric acid, toluenesulfonic acid, methanesulfonic acid or trichloroacetic acid; Lewis acids, such as potassium acid sulfate, borontrifluoride etherate or pyridine hydrochloride; and acid cation exchangers, such as sulfonated condensation products of phenols and formaldehyde or sulfonated polystyrene exchangers. The catalyst may be provided in homogeneous or heterogeneous phase, but homogeneous catalysis with toluenesulfonic acid is preferred.

The starting compounds, that is, digitoxin as well as the orthoformates of the formula II, are known, readily accessible compounds.

The following examples illustrate the present invention and will enable others skilled in the art to understand it more completely. It should be understood, however, that the invention is not limited solely to the particular examples given below.

EXAMPLE 1

15',16'-Methoxymethylidene-digitoxin 5 gm of digitoxin were stirred into a solution consisting of 100 ml of tetrahydrofuran, 50 ml of trimethyl orthoformate and 50 mgm of p-toluenesulfonic acid, and the mixture was allowed to stand at room temperature. The reaction had gone to completion after about 20 minutes, whereupon the reaction mixture was neutralized with triethylamine, then evaporated to dryness, and the residue was crystallized from chloroform/ether, yielding 4.5 gm (about 85 percent of theory) of the compound of the formula

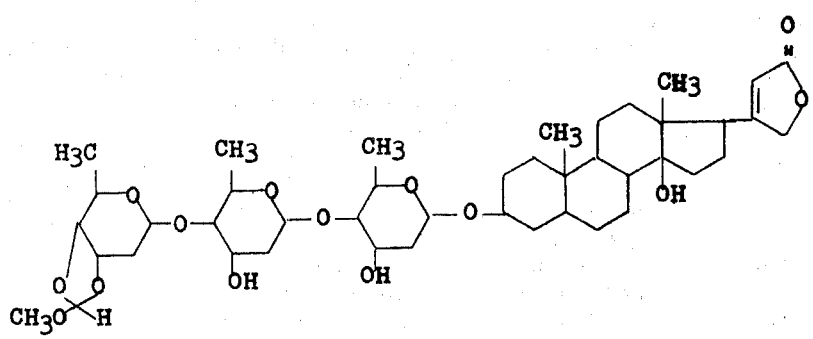

which had a melting point of 190°C.

EXAMPLE 2

15',16'-Ethoxymethylidene-digitoxin

A mixture consisting of 5 gm of digitoxin, 5 ml of triethyl orthoformate, 100 ml of dioxane and 1 gm of a dry styrene-divinyl-benzene copolymer ion-exchange resin (e.g. Dowex W 50) was stirred for about 1 hour at room temperature, whereupon the reaction had gone to completion. The ion-exchanger was then removed by suction filtration, the filtrate evaporated to dryness, and the residue was crystallized from chloroform/ether, yielding 3.8 gm (about 70 percent of theory) of 15',16'-ethoxymethylidene-digitoxin which had a melting point of 193°–195°C.

EXAMPLE 3

15',16'-n-Butoxymethylidene-digitoxin 5 gm of digitoxin were reacted with 5 ml of tri-n-butyl orthoformate in 100 ml of dioxane in the presence of 70 mgm of p-toluenesulfonic acid in a manner analogous to that described in Example 1, the reaction mixture was worked up in analogous fashion, and the evaporation residue was recrystallized from chloroform/ether. 3.6 gm (about 65 percent of theory) of 15',16'-n-butoxymethylidene-digitoxin, m. p. 195°–198°C., were obtained.

The compounds of the present invention, that is, those embraced by formula I above, have useful pharmacodynamic properties. More particularly, they exhibit cardiotonic activities in warm-blooded animals, such as dogs and guinea pigs, and are therefore useful for the treatment of cardiac insufficiency.

It is well known that the practical utilization of cardiac glycosides depends to a large extent upon their secondary qualities, i.e. their specific behavior in the animal organism, such as upon absorption and elimination. For instance, G-strophanthin is perorally sparsely absorbed and rapidly eliminated. On the other hand, while digitoxin undergoes practically complete absorption, its elimination rate is so small that the danger of a cumulative effect exists which may lead to intoxication. Therefore, the maintenance of an optimum glycoside level is often not possible or at least connected with a substantial safety risk. The therapeutic utilization of the acetyl derivatives of digitoxin is also restricted to narrow limits for the above-mentioned reasons. Moreover, it is known that the esterification of such cardiac glycosides may often bring about a substantial reduction of the positive inotropic activity which not only prevents a satisfactory utilization of the glycoside due to the necessary high dosages, but under unfavorable circumstances also introduces the danger of metabolization in the gastrointestinal tract which may easily lead to unintentional over-dosages and even to concentration levels within the toxic range.

The compounds of the present invention combine to a surprising extent all of the desirable property criteria which are expected of a therapeutically useful cardiac glycoside with respect to effectiveness and safety. Thus, the compounds embraced by formula I above retain the practically complete absorption property of digitoxin and have an elimination rate within an optimum range, which completely eliminates the danger of cumulative effects, but on the other hand makes it possible to maintain an optimum blood concentration level over short or long periods of time, as required.

The extraordinarily high stability of the compounds of this invention in an alkaline medium must be emphasized. Moreover, they do not exhibit a reduced positive inotropic activity over the glycoside.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective cardiotonic dosage unit of the compounds according to the present invention is from 0.00083 to 0.084 mgm/kg body weight, preferably from 0.002 to 0.034 mgm/kg body weight.

The following examples illustrate a few pharmaceutical dosage unit compositions comprising a compound of the present invention as an active ingredient and represent the best modes contemplated of putting the invention into practical use. The parts are parts by weight unless otherwise specified.

EXAMPLE 4

Tablets

The tablet composition is compounded from the following ingredients:

| | | |
|---|---:|---|
| 15',16'-Methoxymethylidene-digitoxin | 0.25 | parts |
| Lactose | 85.75 | " |
| Potato starch | 30.0 | " |
| Gelatin | 3.0 | " |
| Magnesium stearate | 1.0 | " |
| Total | 120.0 | parts |

Preparation:

The glycoside is intensively milled with 10 times its weight of lactose, the milled mixture is admixed with the remaining amount of the lactose and the potato starch, the resulting mixture is moistened with an aqueous 10 percent solution of the gelatin, the moist mass is forced through a 1.5 mm-mesh screen, and the resulting granulate is dried at 40°C. The dry granulate is again passed through a 1 mm-mesh screen, admixed with the magnesium stearate, and the composition is compressed into 120 mgm-tablets in a conventional tablet making machine. Each tablet contains 0.25 mgm of the glycoside and is an oral dosage unit composition with effective cardiotonic action.

EXAMPLE 5

Coated Pills

The pill core composition is compounded from the following ingredients:

| | | |
|---|---:|---|
| 15',16'-Ethoxymethylidene-digitoxin | 0.25 | parts |
| Lactose | 32.25 | " |
| Corn starch | 15.00 | " |
| Polyvinylpyrrolidone | 2.00 | " |
| Magnesium stearate | 0.50 | " |
| Total | 50.00 | parts |

Preparation:

The glycoside is intensively milled with 10 times its weight of lactose, the milled mixture is admixed with the remainder of the lactose and the corn starch, the mixture is moistened with an aqueous 15 percent solution of the polyvinylpyrrolidone, the moist mass is forced through a 1 mm-mesh screen, and the resulting granulate is dried at 40°C. and again passed through the screen. The dry granulate is admixed with the magnesium stearate, and the resulting composition is compressed into 50 mgm-pill cores which are subsequently coated in conventional manner with a thin shell consisting essentially of a mixture of sugar and talcum and finally polished with beeswax. Each coated pill contains 0.25 mgm of the glycoside and is an oral dosage unit composition with effective cardiotonic action.

EXAMPLE 6

Drop Solution

The solution is compounded from the following ingredients:

| | | |
|---|---|---|
| 15',16'-Ethoxymethylidene-digitoxin | 0.0125 | parts |
| Saccharin sodium | 0.3 | " |
| Sorbic acid | 0.1 | " |
| Ethanol | 30.0 | " |
| Flavoring | 1.0 | " |
| Distilled water q.s.ad | 100.0 | " |

Preparation:

The glycoside and the flavoring are dissolved in the ethanol, and the sorbic acid and the saccharin sodium are dissolved in the distilled water. The two solutions are uniformly admixed with each other, and the mixed solution is filtered until free from suspended matter. 1 ml of the filtrate contains 0.125 mgm of the glycoside and is an oral dosage unit composition with effective cardiotonic action.

EXAMPLE 7

Hypodermic Solution

The solution is compounded from the following ingredients:

| | | |
|---|---|---|
| 15',16'-Methoxymethylidene-digitoxin | 0.25 | parts |
| Polyethyleneglycol 600 | 700.0 | " |
| Tartaric acid | 150.0 | " |
| Distilled water q.s.ad | 3000.0 | parts by vol. |

Preparation:

The tartaric acid, the polyethyleneglycol and the glycoside are successively dissolved in a sufficient amount of distilled water to the indicated volume and then filtered until free from suspended matter. The filtrate is filled into white 3 ml-ampules in an atmosphere of nitrogen, which are then sterilized for 20 minutes at 120°C. and sealed. Each ampule contains 0.25 mgm of the glycoside, and the contents thereof are an injectable dosage unit composition with effective cardiotonic action.

EXAMPLE 8

Suppositories

The suppository composition is compounded from the following ingredients:

| | | |
|---|---|---|
| 15',16'-n-Butoxymethylidene-digitoxin | 0.25 | parts |
| Lactose | 4.75 | " |
| Suppository base (e.g. cocoa butter) | 1695.0 | " |
| Total | 1700.0 | parts |

Preparation:

The glycoside and the lactose are admixed and the mixture is milled. The milled mixture is uniformly stirred with the aid of an immersion homogenizer into the suppository base, which had previously been melted and cooled to 40°C. The resulting composition is cooled to 37°C., and 1700 mgm-portions thereof are poured into cooled suppository molds and allowed to harden therein. Each suppository contains 0.25 mgm of the glycoside and is a rectal dosage unit composition with effective cardiotonic action.

Analogous results are obtained when any one of the other 15',16'-alkoxymethylidene-digitoxins embraced by formula I is substituted for the particular acylated glycoside in Examples 4 through 8. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:
1. A compound of the formula

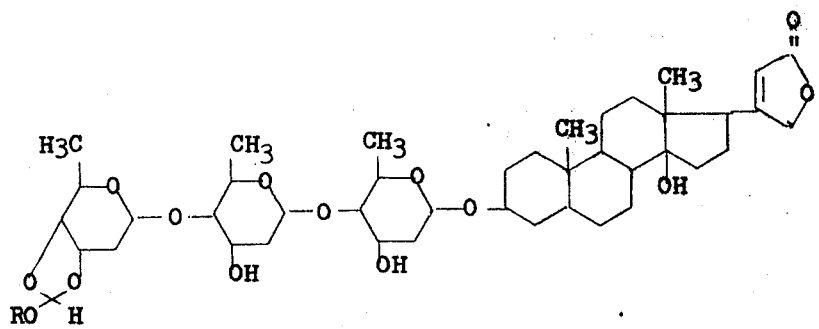

wherein R is n-alkyl of 1 to 4 carbon atoms.
2. The compound of claim 1 which is 15',16'-methoxymethylidene-digitoxin.
3. The compound of claim 1 which is 15',16'-ethoxymethylidene-digitoxin.
4. The compound of claim 1 which is 15',16'-n-butoxymethylidene-digitoxin.

* * * * *